US010887505B2

(12) United States Patent
Hu et al.

(10) Patent No.: US 10,887,505 B2
(45) Date of Patent: Jan. 5, 2021

(54) AUTO-FOCUSING

(71) Applicant: ZHEJIANG UNIVIEW TECHNOLOGIES CO., LTD, Hangzhou (CN)

(72) Inventors: Xingxing Hu, Hangzhou (CN); Tianjun Chen, Hangzhou (CN)

(73) Assignee: ZHEJIANG UNIVIEW TECHNOLOGIES CO., LTD, Hangzhou (CN)

(*) Notice: Subject to any disclaimer, the term of this patent is extended or adjusted under 35 U.S.C. 154(b) by 250 days.

(21) Appl. No.: 15/781,655

(22) PCT Filed: Sep. 22, 2016

(86) PCT No.: PCT/CN2016/099679
§ 371 (c)(1),
(2) Date: Nov. 9, 2018

(87) PCT Pub. No.: WO2017/097009
PCT Pub. Date: Jun. 15, 2017

(65) Prior Publication Data
US 2019/0068888 A1 Feb. 28, 2019

(30) Foreign Application Priority Data
Dec. 10, 2015 (CN) .......................... 2015 1 0917459

(51) Int. Cl.
H04N 5/232 (2006.01)
G02B 7/36 (2006.01)
G06T 7/80 (2017.01)

(52) U.S. Cl.
CPC ....... H04N 5/232123 (2018.08); G02B 7/365 (2013.01); G06T 7/80 (2017.01);
(Continued)

(58) Field of Classification Search
CPC .......................... H04N 5/232123; G02B 7/365
See application file for complete search history.

(56) References Cited

U.S. PATENT DOCUMENTS 4,980,773 A * 12/1990 Suda .................. H04N 5/23212
348/355
5,070,353 A 12/1991 Komiya et al.
(Continued)

FOREIGN PATENT DOCUMENTS

CN 1220410 A 6/1999
CN 102200674 A 9/2011
(Continued)

OTHER PUBLICATIONS

European Patent Office, Extended European Search Report Issued in Application No. 16872204.9, dated Oct. 25, 2018, Germany, 9 pages.
(Continued)

Primary Examiner — Sinh Tran
Assistant Examiner — Zhenzhen Wu
(74) Attorney, Agent, or Firm — McCoy Russell LLP

(57) ABSTRACT

A method and a device of a auto-focusing are provided. The method includes: for each of a set comprising N frequency bands of an image, acquiring a FV corresponding to each of focal points during a focusing process; acquiring an interested focal point which corresponds to a maximum FV for the lowest frequency band in the set; if the FV corresponding to the interested focal point for each other frequency band in the set is the maximum FV, determining that the interested focal point is an in-focus point, if the FV corresponding to the interested focal point for any other frequency band is not the maximum FV deleting at least one frequency band for which the FV corresponding to the interested focal point reaches maximum from the set, acquiring a new interested (Continued)

focal point based on the new set, and repeating the above determinations based on the new interested focal point.

16 Claims, 6 Drawing Sheets

(52) U.S. Cl.
CPC .............. *G06T 2207/20021* (2013.01); *G06T 2207/20048* (2013.01)

(56) References Cited

U.S. PATENT DOCUMENTS

| | | | |
|---|---|---|---|
| 5,115,262 | A | 5/1992 | Komiya |
| 6,222,588 | B1* | 4/2001 | Yamazaki .......... H04N 5/23212 348/355 |
| 2001/0026323 | A1 | 10/2001 | Bompard |
| 2004/0227843 | A1* | 11/2004 | Watanabe .......... H04N 5/23212 348/354 |
| 2009/0066830 | A1 | 3/2009 | Fujii et al. |
| 2009/0244359 | A1* | 10/2009 | Ohta ...................... G03B 13/36 348/354 |
| 2011/0236007 | A1 | 9/2011 | Park et al. |
| 2018/0316869 | A1* | 11/2018 | Lin ................... H04N 5/232123 |
| 2019/0179110 | A1* | 6/2019 | Takinoiri ......... H04N 5/232121 |

FOREIGN PATENT DOCUMENTS

| | | |
|---|---|---|
| CN | 102591099 A | 7/2012 |
| CN | 103886590 A | 6/2014 |
| CN | 104980717 A | 10/2015 |
| CN | 105430270 A | 3/2016 |
| JP | 2009175184 A * | 8/2009 |
| JP | 2009175184 A | 8/2009 |

OTHER PUBLICATIONS

State Intellectual Property Office of the People's Republic of China, Office Action and Search Report Issued in Application No. 201510917459.2, dated Jan. 31, 2018, 17 pages. (Submitted with Partial Translation).

Isa State Intellectual Property Office of the People's Republic of China, International Search Report Issued in Application No. PCT/CN2016/099679, dated Dec. 12, 2016, WIPO, 4 pages.

* cited by examiner

AUTO-FOCUSING

TECHNICAL FIELD

The present disclosure relates to auto-focusing in a video technology.

CROSS REFERENCE TO RELATED APPLICATIONS

The present application is a U.S. National Phase of International Patent Application Serial No. PCT/CN2016/099679 entitled "AUTOMATIC FOCUSING," filed on Sep. 22, 2016. International Patent Application Serial No. PCT/CN2016/099679 claims priority to Chinese Patent Application No. 201510917459.2, filed on Dec. 10, 2015. The entire contents of each of the above-cited applications are hereby incorporated by reference in their entirety for all purposes.

BACKGROUND

In recent years, with the rapid development of computer, network and image processing and transmission technology, the popularization trend of video monitor has become more and more obvious. The video monitor is gradually becoming high-definitive and intelligent. A video monitor system may be used in a plurality of areas, such as intelligent transportation, an intelligent park, a safe city, etc.

In a video monitor system, a platform device (such as a platform camera, etc.) is a more important component. The platform device is a rotatable device. When a moving object is moving, the platform device may rotate along with the moving object to continue capturing images of the moving object. Moreover, the platform device may change a focal point in real time to find the focal point corresponding to the clearest image of the moving object ("the focal point corresponding to the clearest image" is hereinafter referred to as an in-focus point) and capture the clearest image of the moving object at the in-focus point.

To find an in-focus point, a climbing method which is a focus algorithm may be used. The climbing method may find the in-focus point based on an ideal Focus Value (FV) curve. The ideal FV curve generally satisfies the characteristics of a single peak type and unbiasedness.

However, in practical applications, an ideal FV curve may not be acquired in some application scenarios. The curve such as the FV curve as shown in FIG. 1 does not satisfy single peak type, so that the finally found maximum FV may only be a local maximum. That is to say, the found focal point may not be the in-focus point.

SUMMARY

The present disclosure provides a method of auto-focusing, comprising:
acquiring an image;
acquiring, for each of N frequency bands of the image, a Focus Value corresponding to each of focal points during a focusing process, wherein the N frequency bands form a set, and the N is a positive integer greater than 1;
acquiring, for a lowest frequency band in the set, an interested focal point which corresponds to a maximum FV for the lowest frequency band;
determining, for each of other frequency bands than the lowest frequency band in the set, whether the FV corresponding to the interested focal point is a maximum FV for the other frequency band or not;

on the condition that the FV corresponding to the interested focal point for each of the other frequency bands is the maximum FV, determining that the interested focal point is an in-focus point; and
on the condition that the FV corresponding to the interested focal point for any one of the other frequency bands is not the maximum FV,
updating the set by deleting at least one frequency band for which the FV corresponding to the interested focal point reaches maximum from the set,
acquiring a new interested focal point based on the updated set, and
repeating the above determinations based on the new interested focal point.

In a possible design, acquiring, for each of the N frequency bands of the image, the FV corresponding to each of the focal points during the focusing process, comprises:
transforming the image in a spatial domain into a transformed image in a frequency domain;
decomposing the transformed image in the frequency domain into N number of sub-images respectively corresponding to the N frequency bands; and
determining, for each of the N number of sub-images, a FV corresponding to each of the focal points during the focusing process so as to acquire the FV corresponding to each of the focal points during the focusing process for each of the N frequency bands.

In a possible design, the method further comprises sorting the frequency bands in the set in order of the frequency bands before selecting the lowest frequency band from the set.

In a possible design, determining, for each of other frequency bands in the set, whether the FV corresponding to the interested focal point is the maximum FV for the other frequency band or not, comprises:
taking the lowest frequency band in the set as a first frequency band;
setting an initial value of i to 2;
determining whether the FV corresponding to the interested focal point for the i-th frequency band is the maximum FV for the i-th frequency band or not;
on the condition that the FV corresponding to the interested focal point for the i-th frequency band is the maximum FV and the i equals to N, determining that the FV corresponding to the interested focal point for each of the other frequency bands is the maximum FV;
on the condition that the FV corresponding to the interested focal point for the i-th frequency band is the maximum FV and the i is less than N,
updating the i by increasing the i with 1, and
returning to determining whether the FV corresponding to the interested focal point for the i-th frequency band is the maximum FV for the i-th frequency band or not; and
on the condition that the FV corresponding to the interested focal point for the i-th frequency band is not the maximum FV, determining that the FV corresponding to the interested focal point for any one of the other frequency bands is not the maximum FV.

In a possible design, determining, for each of the other frequency bands in the set, whether the FV corresponding to the interested focal point is the maximum FV for the other frequency band or not, comprises:
taking the lowest frequency band in the set as a N-th frequency band;
setting an initial value of i to N−1;

determining whether the FV corresponding to the interested focal point for the i-th frequency band is the maximum FV for the i-th frequency band or not;

on the condition that the FV corresponding to the interested focal point for the i-th frequency band is the maximum FV and the i equals to 1, determining that the FV corresponding to the interested focal point for each of the other frequency bands is the maximum FV;

on the condition that the FV corresponding to the interested focal point for the i-th frequency band is the maximum FV and the i is greater than i, updating the i by decreasing the i with 1, and returning to determining whether the FV corresponding to the interested focal point for the i-th frequency band is the maximum FV for the i-th frequency band or not; and on the condition that the FV corresponding to the interested focal point for the i-th frequency band is not the maximum FV, determining that the FV corresponding to the interested focal point for any one of the other frequency bands is not the maximum FV.

In a possible design, deleting at least one frequency band for which the FV corresponding to the interested focal point reaches a maximum from the set comprises:

on the condition that the FV corresponding to the interested focal point for each of a first M number of frequency bands in the set is the maximum FV but the FV corresponding to the interested focal point for the (M+1)-th frequency band is not the maximum FV, deleting the first M number of frequency bands from the set, wherein the M is a positive integer less than the N.

In a possible design, deleting at least one frequency band for which the FV corresponding to the interested focal point reaches a maximum from the set comprises:

on the condition that the FV corresponding to the interested focal point for each of a last (N−M+1) number of frequency bands in the set is the maximum FV but the FV corresponding to the interested focal point for the M-th frequency band is not the maximum FV, deleting the last (N−M+1) number of frequency bands from the set, where the M is a positive integer less than the N.

In a possible design, the method further comprises:

when only one frequency band is remained in the set, determining a focal point which corresponds to the maximum FV for the frequency band as the in-focus point.

The second aspect of the present disclosure provides a device of auto-focusing comprising a processor configured to perform the following operations by reading machine-executable instruction corresponding to a control logic of auto-focusing stored in a machine-readable storage medium to execute the machine-executable instruction:

acquiring an image;

acquiring, for each of N frequency bands of the image, a Focus Value corresponding to each of focal points during a focusing process, wherein the N frequency bands form a set, and the N is a positive integer greater than 1;

acquiring, for a lowest frequency band in the set, an interested focal point which corresponds to a maximum FV for the lowest frequency band;

determining, for each of other frequency bands than the lowest frequency band in the set, whether the FV corresponding to the interested focal point is a maximum FV for the other frequency band or not;

on the condition that the FV corresponding to the interested focal point for each of the other frequency bands is the maximum FV, determining that the interested focal point is an in-focus point; and on the condition that the FV corresponding to the interested focal point for any one of the other frequency bands is not the maximum FV, updating the set by deleting at least one frequency band for which the FV corresponding to the interested focal point reaches maximum from the set, acquiring a new interested focal point based on the updated set, and repeating the above determinations based on the new interested focal point.

In a possible design, the machine-executable instruction causes the processor to execute the following operations when acquiring, for each of N frequency bands of the image, a Focus Value corresponding to each of focal points during a focusing process:

transforming the image in a spatial domain into a transformed image in a frequency domain;

decomposing the transformed image in the frequency domain into N number of sub-images respectively corresponding to the N frequency bands; and determining, for each of the N number of sub-images, a FV corresponding to each of the focal points during the focusing process so as to acquire the FV corresponding to each of the focal points during the focusing process for each of the N frequency bands.

In a possible design, before acquiring the interested focal point which corresponds to a maximum FV for the lowest frequency band, the machine-executable instruction further causes the processor to execute the following operation:

Sorting the frequency bands in the set in order of the frequency bands.

In a possible design, the machine-executable instruction causes the processor to execute the following operations when determining, for each of other frequency bands in the set, whether the FV corresponding to the interested focal point is the maximum FV for the other frequency band or not:

taking the lowest frequency band in the set as a first frequency band;

setting an initial value of i to 2;

determining whether the FV corresponding to the interested focal point for the i-th frequency band is the maximum FV for the i-th frequency band or not;

on the condition that the FV corresponding to the interested focal point for the i-th frequency band is the maximum FV and the i equals to N, determining that the FV corresponding to the interested focal point for each of the other frequency bands is the maximum FV;

on the condition that the FV corresponding to the interested focal point for the i-th frequency band is the maximum FV and the i is less than N, updating the i by increasing the i with 1, and returning to determining whether the FV corresponding to the interested focal point for the i-th frequency band is the maximum FV for the i-th frequency band or not; and on the condition that the FV corresponding to the interested focal point for the i-th frequency band is not the maximum FV, determining that the FV corresponding to the interested focal point for any one of the other frequency bands is not the maximum FV.

In a possible design, the machine-executable instruction causes the processor to execute the following operations when determining, for each of the other frequency bands in the set, whether the FV corresponding to the interested focal point is the maximum FV for the other frequency band or not:

taking the lowest frequency band in the set as a N-th frequency band;

setting an initial value of i to N−1;

determining whether the FV corresponding to the interested focal point for the i-th frequency band is the maximum FV for the i-th frequency band or not;

on the condition that the FV corresponding to the interested focal point for the i-th frequency band is the maximum FV and the i equals to 1, determining that the FV corresponding to the interested focal point for each of the other frequency bands is the maximum FV;

on the condition that the FV corresponding to the interested focal point for the i-th frequency band is the maximum FV and the i is greater than 1, updating the i by decreasing the i with 1, and returning to determining whether the FV corresponding to the interested focal point for the i-th frequency band is the maximum FV for the i-th frequency band or not; and on the condition that the FV corresponding to the interested focal point for the i-th frequency band is not the maximum FV, determining that the FV corresponding to the interested focal point for any one of the other frequency bands is not the maximum FV.

In a possible design, the machine-executable instruction causes the processor to execute the following operation when deleting at least one frequency band for which the FV corresponding to the interested focal point reaches a maximum from the set:

on the condition that the FV corresponding to the interested focal point for each of a first M number of frequency bands in the set is the maximum FV but the FV corresponding to the interested focal point for the (M+1)-th frequency band is not the maximum FV, deleting the first M number of frequency bands from the set, wherein the M is a positive integer less than the N.

In a possible design, the machine-executable instruction causes the processor to execute the following operation when deleting at least one frequency band for which the FV corresponding to the interested focal point reaches a maximum from the set:

on the condition that the FV corresponding to the interested focal point for each of a last (N−M+1) number of frequency bands in the set is the maximum FV but the FV corresponding to the interested focal point for the M-th frequency band is not the maximum FV, deleting the last (N−M+1) number of frequency bands from the set, where the M is a positive integer less than the N.

In a possible design, the machine-executable instruction further causes the processor to execute the following operation:

when only one frequency band is remained in the set, determining a focal point corresponding to the maximum FV for the frequency band as the in-focus point.

Based on the above technical solution, in an embodiment of the present disclosure, the optimal focus point may be determined based on FVs for the N frequency bands so that the clearest image may also be captured even if a curve formed by the FVs does not satisfy the characteristics such as a single peak type and unbiasedness. Moreover, when the FVs for the N frequency bands are used to determine the optimal focus point, even if there is a local maximum FV (i.e., a pseudo peak) for a particular frequency band, the pseudo peak may be eliminated by the FVs corresponding to other frequency bands, thereby avoiding finding an inaccurate focus point. Moreover, taking the FV for the lowest frequency band as a reference FV and then gradually switching to the FV corresponding to a higher frequency band as the reference FV not only ensures that a searching direction is not lost, but also enables the reference FV to have a better anti-interference ability. In this way, the occurrence probability of a pseudo peak may be greatly reduced, and the problem of focusing failure due to a poor zooming and following effect may be avoided, thereby ensuring the rapidity of a focusing process and satisfying a real-time monitoring demand.

DETAILED DESCRIPTION OF THE EMBODIMENTS

The foregoing disclosure is merely illustrative of preferred embodiments of the disclosure but is not intended to limit the disclosure, and any modifications, equivalent substitutions, adaptations, thereof made without departing from the spirit and scope of the disclosure shall be encompassed in the claimed scope of the appended claims.

Figure 1:
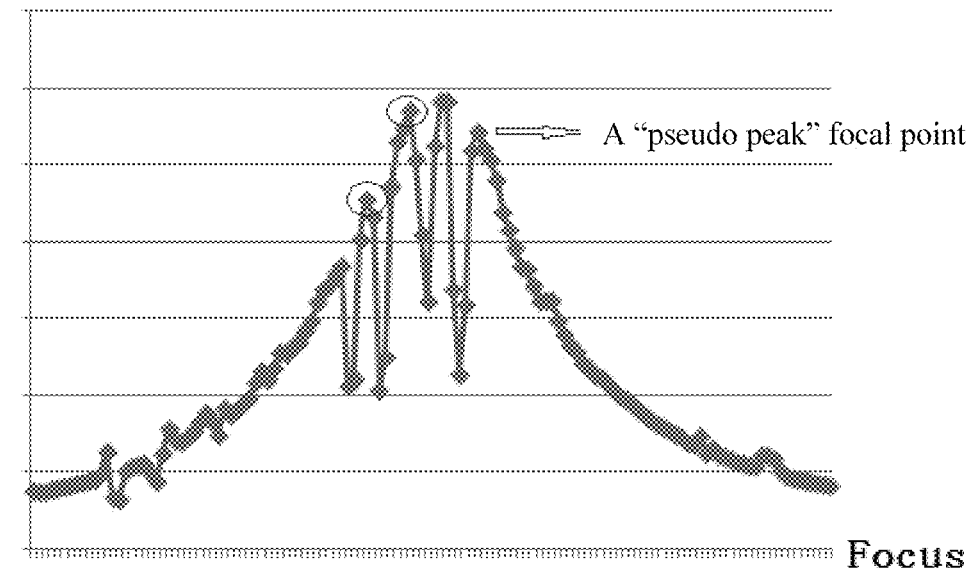
FIG. 1 is a schematic diagram of a FV curve that does not satisfy a single peak type.

To find an in-focus point, a commonly used focus algorithm includes a climbing method. The climbing method may be used to find the in-focus point based on an ideal FV curve. An ideal FV curve generally satisfies a single peak type and unbiasedness. In practical applications, the FV curve as shown in FIG. 1 does not satisfy a single peak type. The finally found maximum FV may only be a local maximum, i.e., a pseudo peak value. The focal point corresponding to the local maximum FV may not be the in-focus point.

On the other hand, if a platform device does perform well in zooming and following effect in an actual application, the problem of focusing failure may occur even if an ideal FV curve is acquired. For example, although the FV curve shown in FIG. 2 satisfies a single peak type and unbiasedness, since the peak range of the FV curve is narrower, the finally found focal point at the time of zooming and following may fall outside the peak range, which may result in focusing failure of the platform device at the end of zooming.

To solve the above problem, in a feasible implementation, when a platform device detects a moving object or finds an abnormal FV curve during a focusing process, the focusing may be paused, and then be continued after the moving object leaves from the monitoring scene or the FV curve is found to become normal. A video monitor system generally is required to have real-time monitoring scene, however, the above method will lead to a longer focusing time, thereby affecting experience of a user.

Figure 3A:
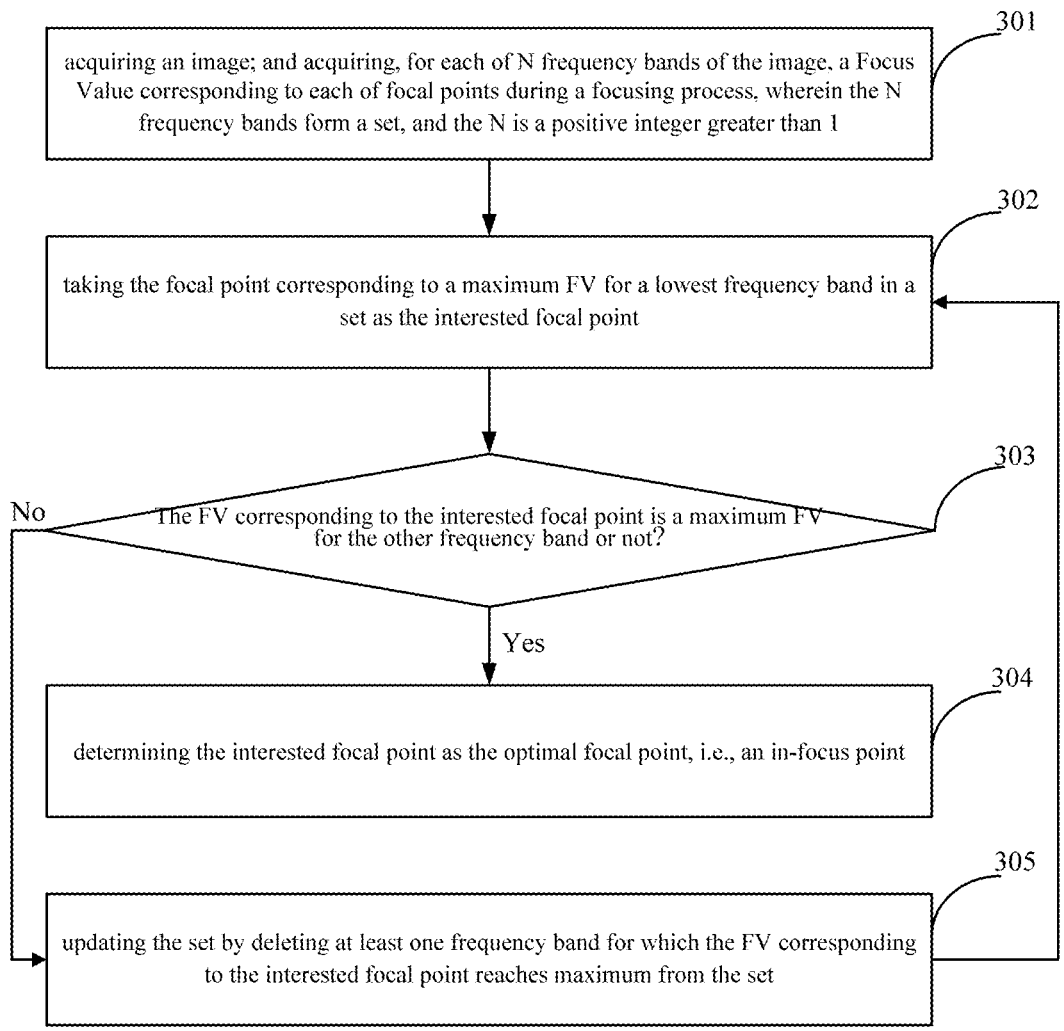
FIG. 3A is a flow diagram of a method of auto-focusing according to an example of the present disclosure.

In view of the above problems, an embodiment of the present disclosure provides a method of auto-focusing, which may be applied to a platform device (such as a platform device, etc.) of a video monitor system. Herein, when a moving object is moving, the platform device may rotate along with the moving object to capture images of the moving object. To capture the clearest image of the moving object, the platform device will usually change its focal point in real time to find an in-focus point and capture the image of the moving object at the in-focal point. Based on this, to find the in-focal point in the above application scenario, as shown in FIG. 3A, the method of auto-focusing may specifically include the following Blocks 301 to 305.

At Block 301: acquiring an image; and acquiring, for each of N frequency bands of the image, a Focus Value corresponding to each of focal points during a focusing process, wherein the N frequency bands form a set, and the N is a positive integer greater than 1.

Figure 2:
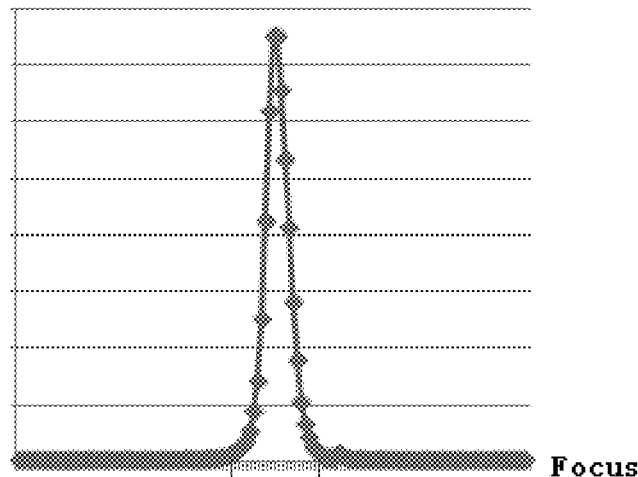
FIG. 2 is a schematic diagram of a FV curve with a narrow peak range.

Herein, when the moving object is moving, during a platform device changes the focal point to find an in-focus point, the Focus Value corresponding to each of focal points may be acquired. These FVs are discrete points, which may form a curve based on the changing trend of these FVs. The curve is a FV curve. As shown in FIG. 1 and FIG. 2, the abscissas of the FV curve are the values of the constantly changing focal point; the ordinates of the FV curve are the FVs. The FV is used to represent the definition of the image corresponding to the focal point, i.e., the definition of the currently acquired image, which may characterize the energy of the focal point. It should be noted that the FV curve shown in FIG. 1 and FIG. 2 is generally not acquired in practical applications, i.e., the focal points will only be part of the focal points in FIG. 1 and FIG. 2, and may contain only the first half of the focal points if possible. In this way, the curve formed by the corresponding different FVs may also be only the first half of the curve. FIG. 1 and FIG. 2 are only examples.

In the process of determining a focal point, it is actually to find an interested focal point corresponding to a maximum FV. The interested focal point corresponding to a maximum FV is the focal point of the clearest image. When using this focal point to capture an image, the image is the clearest image of the moving object. If the focal points corresponding to those FVs other than the maximum FV are used to capture an image, the clearest image will generally not be acquired.

In an embodiment of the present disclosure, acquiring, for each of the N frequency bands of the image, the FV corresponding to each of the focal points during the focusing process may specifically include, but is not limited to: transforming the image in a spatial domain into a transformed image in a frequency domain; decomposing the transformed image in the frequency domain into N number of sub-images respectively corresponding to the N frequency bands; and determining, for each of the N number of sub-images, a FV corresponding to each of the focal points during the focusing process so as to acquire the FV corresponding to each of the focal points during the focusing process for each of the N frequency bands.

Herein, the spatial domain is also referred to as an image space, which is a space formed in a unit of pixels. In the spatial domain, the length/distance is taken as an independent variable, and the direct processing for a pixel value may be referred to as spatial domain processing. The frequency domain is to describe the characteristics of an image by taking the frequency (i.e., wavenumber) as an independent variable. The spatial change of the pixel value of an image may be decomposed into a linear superposition of a simple oscillation function with different amplitudes, frequencies and phases. The composition and distribution of the different frequency components in the image are referred to as frequency spectrum. The decomposing, processing and analyzing of the frequency characteristics of the image may be referred to as frequency domain processing or wavenumber domain processing. The frequency domain processing is mainly used in image-frequency-related processing, such as image restoration, image reconstruction, radiation transformation, edge enhancement, image sharpening, image smoothing, noise suppression, frequency spectrum analysis, texture analysis, etc.

An image acquired by a platform device is usually an image in a spatial domain. The image in the spatial domain and the image in a frequency domain may be transformed into each other. The processing blocks may be as follows: 1, performing the two-dimensional discrete Fourier transform or Wavelet transform on an image, and transforming the image in the spatial domain into the image in the frequency domain; and 2, analyzing and processing the frequency spectrum of the image in the frequency domain to change the frequency characteristics of the image. For example, different digital filters may be designed to filter the frequency spectrum of the image. On this basis, transforming an image in a spatial domain into an image in a frequency domain may specifically include, but is not limited to: transforming the image in the spatial domain into the image in the frequency domain by a Fourier transform, wherein the used Fourier transform formula may be:

$$F(u, v) = \int_{-\infty}^{\infty} f(x, y) e^{-j2\pi(ux+vy)} dxdy$$

In this formula, (x, y) are coordinate values of a pixel in an image in a spatial domain. f (x, y) are gray values of the pixel (x, y) in the image in the spatial domain. (u, v) area frequency start value and a frequency end value of an image in a frequency domain, which may represent a frequency band range, such as the frequency band from 30 to 80. F (u, v) are image values for the frequency band (u, v) in the image in the frequency domain, and may hereinafter be referred to as an image in the frequency range (u, v).

Figure 4A:
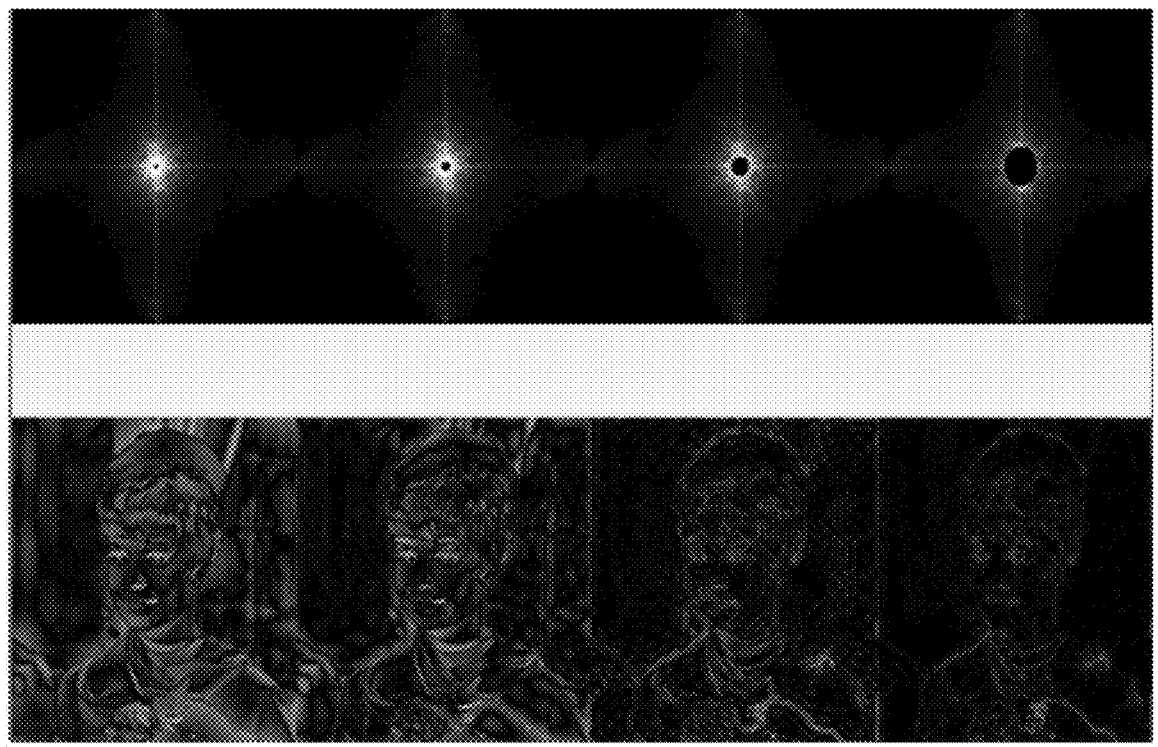
FIGS. 4A and 4B are schematic diagrams of contrasting images according to an example of the present disclosure.

In practical applications, an image in a frequency band range (u, v) may usually be consisted of a plurality of sub-images respectively corresponding to a plurality of frequency bands. Thus, an image in a frequency domain may be decomposed into N number of sub-images respectively corresponding to the N frequency bands. A sub-image may be an image in a picture layer. For example, the image corresponding to the frequency band [30-80] may be decomposed into sub-images corresponding to the frequency band [30-40], sub-images corresponding to the frequency band [40-50], sub-images corresponding to the frequency band [50-60], sub-images corresponding to the frequency band [60-70], and sub-images corresponding to the frequency band [70-80]. FIG. 4A is a schematic diagram in which an image in a frequency domain is decomposed into a plurality of sub-images respectively corresponding to a plurality of frequency bands.

In the process where platform device changes its focal point to find an in-focus point (i.e., the focusing process of the platform device), the FVs which correspond to each of sub-images for these frequency bands (the N number of sub-images respectively for the N frequency bands) may be measured in real time to acquire the FV corresponding to each of the focal points for the N frequency bands. For example, the FV corresponding to each of the focal points for the frequency band [30-40], the FV corresponding to each of the focal points for the frequency band [40-50], the FV corresponding to each of the focal points for the frequency band [50-60], the FV corresponding to each of the focal points for the frequency band [60-70], and the FV corresponding to each of the focal points for the frequency band [70-80] may be acquired. In this way, a set including FV corresponding to each of the focal points for the N frequency bands may be acquired, i.e., the FV corresponding to each of the focal points for the frequency band [30-40], the frequency band [40-50], the frequency band [50-60], the frequency band [60-70], and the frequency band [70-80] during a focusing process are included in the set.

It is to be noted that, in an embodiment of the present disclosure, there is no need to compare these FVs corresponding to the different focal points acquired in Block 301.

At Block 302: taking the focal point corresponding to a maximum FV for a lowest frequency band in a set as the interested focal point.

In an embodiment of the present disclosure, the method may comprise sorting the frequency bands in the set in an ascending order of the frequency bands before selecting the lowest frequency band from the set. Alternatively, the method may comprise sorting N number of frequency bands in a set in a descending order of the frequency bands.

For example, in an ascending order of the frequency bands, the sorting results of the N frequency bands is the frequency band [30-40], the frequency band [40-50], the frequency band [50-60], the frequency band [60-70], and the frequency band [70-80]. Alternatively, in a descending order of the frequency bands, the sorting results of the N frequency bands is the frequency band [70-80], the frequency band [60-70], the frequency band [50-60], the frequency band [40-50], and the frequency band [30-40]. Herein, the lowest frequency band in the set may be quickly found based on the sorted set, such as the first band in the set or the last band in the set, thereby enabling to increase processing efficiency.

In an embodiment of the present disclosure, after the lowest frequency band is selected, the maximum FV for the lowest frequency band, i.e. The ordinate for the lowest frequency band may be acquired, and the abscissa corresponding to the maximum FV for the lowest frequency band is the interested focal point corresponding to a maximum FV. Acquiring the maximum FV may be learned based on a climbing algorithm.

In an example, it is possible to determine whether the FV corresponding to the interested focal point is a maximum FV based on the changing rate of the FV corresponding to the interested focal point and the FV corresponding to an adjacent previous focal point. For example, the FVs corresponding to the different focal points before the interested focal point have a rising changing rate. However, when reaching the interested focal point, if the changing rate between the FV corresponding to the interested focal point and the FV corresponding to the adjacent previous focal point is less than one preset threshold, it may be assumed that the FV corresponding to the interested focal point is the maximum FV. Herein, the changing rate between the FV corresponding to the interested focal point and the FV corresponding to the adjacent previous focal point may be acquired by:

the changing rate between the FV corresponding to the interested focal point and the FV corresponding to the adjacent previous focal point=(the FV corresponding to the interested focal point−the FV corresponding to the previous focal point)/the FV corresponding to the previous focal point.

In another example, it is assumed that the FV corresponding to each of the focal points before a focal point 1 are increasing, the FV corresponding to the focal point 1 is greater than the FV corresponding to an adjacent previous focal point 2, and the FV corresponding to the focal point 1 is greater than the FV corresponding to the adjacent focal point 3. The FV corresponding to the focal point 1 may be considered to be the maximum FV if the difference between the FV corresponding to the focal point 1 and the FV corresponding to the focal point 3 is greater than a preset value.

In another example, it is assumed that the FV corresponding to each of the focal points before a focal point 1 are increasing, the FV corresponding to the focal point 1 is greater than the FV corresponding to an adjacent previous focal point 2, and the FV corresponding to the focal point 1 is greater than the FV of an adjacent next focal point 3. The FV corresponding to the focal point 1 may be considered to be the maximum FV if the difference between the FV corresponding to the focal point 1 and the FV corresponding to the focal point 3 is not greater than a preset value but the FV corresponding to the adjacent focal point 3 is greater than the FV of its adjacent next focal point 4.

At Block 303: determining, for each of other frequency bands than the lowest frequency band in the set, whether the FV corresponding to the interested focal point is a maximum FV for the other frequency band or not; if so, executing Block 304; if not, executing Block 305.

Herein, the interested focal point refers to the focal point corresponding to the maximum FV for the lowest frequency band acquired in Block 302.

Figure 3B:
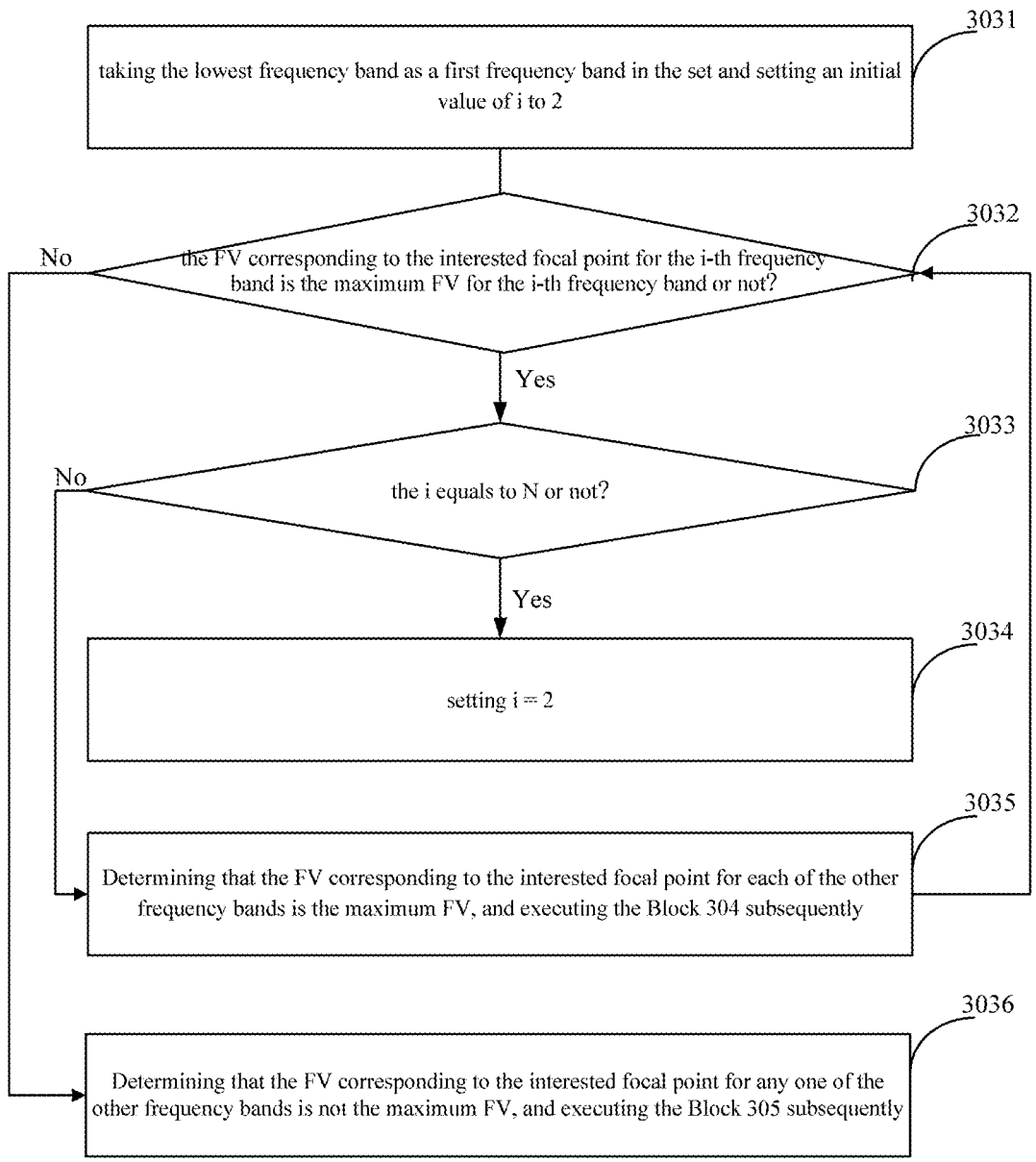
FIG. 3B is a possible implementation flow diagram of a Block 303 in the method shown in FIG. 3A.

In an embodiment of the present disclosure, when the N frequency bands in a set are sorted in an ascending order of the frequency bands, determining, for each of other frequency bands than the lowest frequency band in the set, whether the FV corresponding to the interested focal point is a maximum FV for the other frequency band or not may include the following Blocks 3031-3035 as shown in FIG. 3B.

At Block 3031: taking the lowest frequency band as a first frequency band in the set and setting an initial value of I to 2 after acquiring the interested focal point in Block 302.

At Block 3032: determining whether the FV corresponding to the interested focal point for the i-th frequency band is the maximum FV for the i-th frequency band or not; if so, executing Block 3033; if not, executing Block 3036.

At Block 3033: determining whether the i equals to N or not; if so, executing Block 3035; if not, executing Block 3034.

At Block 3034: setting i=2 and repeating the execution of Block 3032.

At Block 3035: determining that the FV corresponding to the interested focal point for each of the other frequency bands is the maximum FV, and executing the Block 304 subsequently.

At Block 3036: determining that the FV corresponding to the interested focal point for any one of the other frequency bands is not the maximum FV, and executing the Block 305 subsequently.

In an ascending order of the frequency bands, the sorting result of the N frequency bands are the frequency band

[30-40], the frequency band [40-50], the frequency band [50-60], the frequency band [60-70], and the frequency band [70-80], which is taken as an example to describe the above process. After the focal point 1 corresponding to the maximum FV for the frequency band [30-40] is acquired, the frequency band [30-40] is taken as the first frequency band to determine whether the FV corresponding to the focal point 1 for the (i=2)-th frequency band has already reached the maximum FV or not. If so, it is determined whether the second frequency band is the last frequency band in the set or not, and if not, i=2+1=3 is set and it is determined whether the FV corresponding to the focal point 1 for the third frequency band has reached the maximum FV or not. If so, it is determined whether the third frequency band is the last frequency band in the set or not, and if not, i=3+1=4 is set and it is determined whether the FV corresponding to the focal point 1 for the fourth frequency band has already reached the maximum FV or not, and so on. It is finally determined that the FV corresponding to the focal point 1 for other frequency bands in the set are all the maximum FVs, or the FV corresponding to the focal point 1 for other frequency bands in the set are not all the maximum FVs.

Figure 3C:
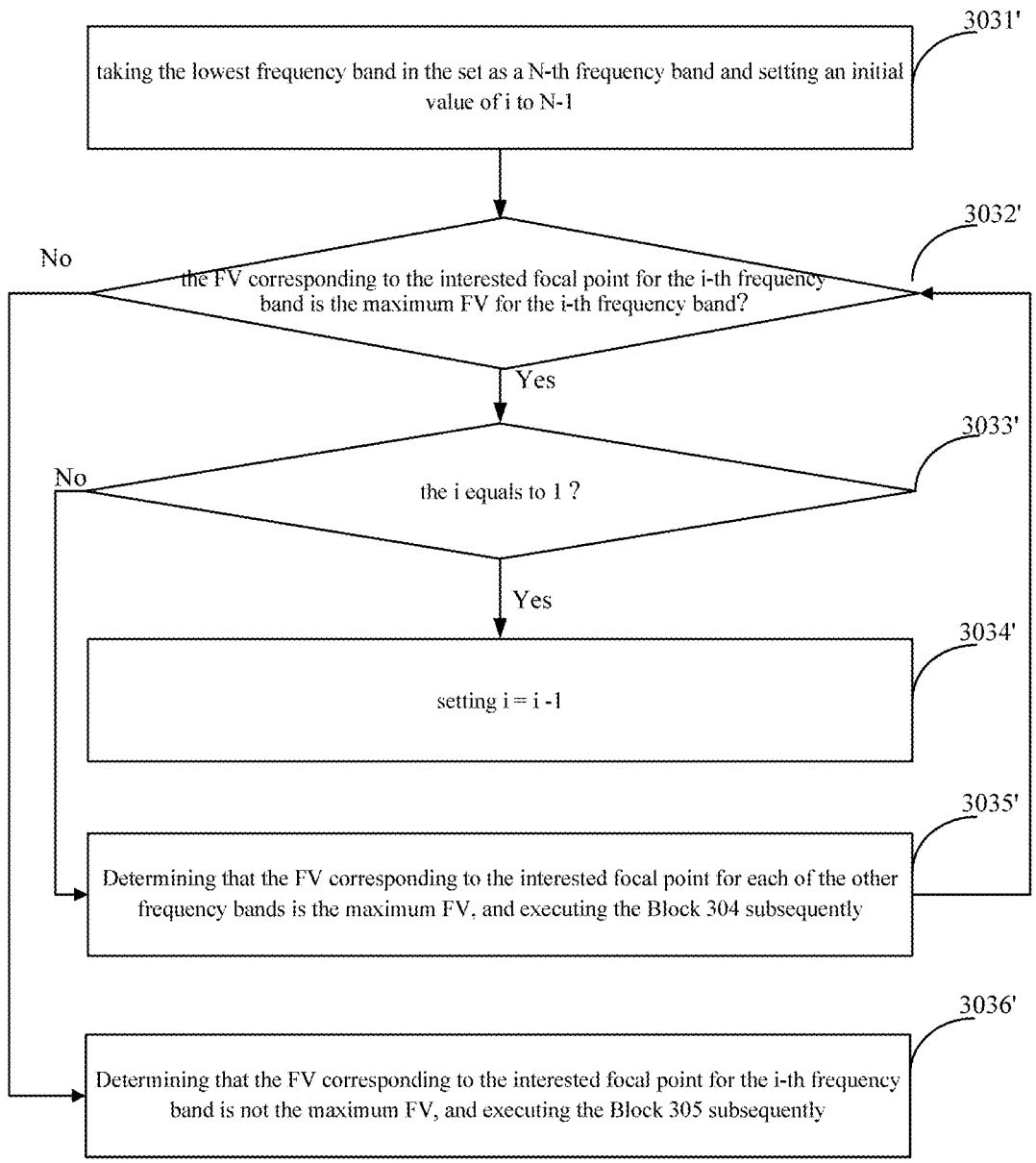
FIG. 3C is another possible implementation flow diagram of a Block 303 in the method shown in FIG. 3A.

Based on the above way, all of the frequency band [40-50], the frequency band [50-60], the frequency band [60-70], and the frequency band [70-80] may not reach the maximum FV after the focal point 1 corresponding to the maximum FV for the frequency band [30-40] is acquired. In this case, it may be considered that the FV is in a rising stage. When it is determined whether the FV corresponding to the focal point 1 for the frequency band [40-50] has already reached the maximum FV, the determination result may be that the FV has not reached the maximum FV. In this way, it is possible to directly determine that the FV corresponding to the focal point 1 for other frequency bands in the set are not all the maximum FVs without determination for the frequency band [50-60], the frequency band [60-70], and the frequency band [70-80], thereby enabling to effectively improve processing efficiency In an embodiment of the present disclosure, when N frequency bands in a set are sorted in order of the frequency bands, determining, for each of other frequency bands in the set, whether the FV corresponding to the interested focal point is the maximum FV for the other frequency band or not may include the following Blocks 3031'-3036' as shown in FIG. 3C.

At Block 3031': taking the lowest frequency band in the set as a N-th frequency band and setting an initial value of i to N−1 after acquiring the interested focal point in Block 302.

At Block 3032': determining whether the FV corresponding to the interested focal point for the i-th frequency band is the maximum FV for the i-th frequency band or not; if so, executing Block 3033'; if not, executing Block 3036'.

At Block 3033': determining whether the i equals to 1 or not; if so, executing Block 3035; if not, executing Block 3034'.

At Block 3034': setting i=i−1 and repeating the execution of Block 3032'.

At Block 3035': determining that the FV corresponding to the interested focal point for each of the other frequency bands is the maximum FV, and executing the Block 304 subsequently.

At Block 3036': determining that the FV corresponding to the interested focal point for the i-th frequency band is not the maximum FV, and executing the Block 305 subsequently.

Optionally, it is possible to perform determination only between the FV corresponding tithe interested focal point for the i-th frequency band and the FV corresponding to its adjacent focal point during determining whether the FV of the interested focal point for the i-th frequency band is a maximum value or not in the above Blocks 3032 and 3032', without calculating and determining one by one from the first focal point for the i-th frequency band. The specific determination process may refer to three examples exemplified in Block 302, which will not be described here.

At Block 304: determining the interested focal point as the optimal focal point, i.e., an in-focus point and capturing the image of the moving object at the in-focus point by the platform device.

At Block 305: updating the set by deleting at least one frequency band for which the FV corresponding to the interested focal point reaches maximum from the set, acquiring a new interested focal point based on the updated set, and returning to Block 302.

In an embodiment of the present disclosure, when N frequency bands in a set are sorted in an ascending order of the frequency bands, deleting at least one frequency band from a set may specifically include, but is not limited to: if the FV corresponding to the interested focal point for each of a first M number of frequency bands in the set is the maximum FV but the FV corresponding to the interested focal point for the (M+1)-th frequency band is not the maximum FV, deleting the first M number of frequency bands from the set, wherein the M is a positive integer less than the N.

For example, after the focal point 1 corresponding to the maximum FV for the frequency band [30-40] is acquired, the frequency band [40-50] may have reached the maximum FV, and the frequency band [50-60], the frequency band [60-70], and the frequency band [70-80] may not reach maximum FV. In this case, it may be considered that the FV is in a rising stage. When it is determined whether the FV corresponding to the focal point 1 for the frequency band [40-50] has reached the maximum FV or not, the determination result may be that the FV has reached the maximum FV. When it is determined whether the FV corresponding to the focal point 1 for the frequency band [50-60] has reached the maximum FV or not, the determination result may be that the FV has not reached the maximum FV. Therefore, the frequency band [30-40] and the frequency band [40-50] may be deleted from the set. In this way, the processing will start directly from the frequency band [50-60] in the next processing, thereby enabling to effectively improve processing efficiency.

In an embodiment of the present disclosure, when N frequency bands in a set are sorted in order of the frequency bands, deleting at least one frequency band from a set may specifically include, but is not limited to: if the FV corresponding to the interested focal point for each of a last (N−M+1) number of frequency bands in the set is the maximum FV but the FV corresponding to the interested focal point for the M-th frequency band is not the maximum FV, deleting the last (N−M+1) number of frequency bands from the set, where the M is a positive integer less than the N.

In an embodiment of the present disclosure, after deleting at least one frequency band from the set, before returning to Block 302, it is also possible to determining an interested focal point which corresponds to the maximum FV for only one frequency band remained in the set as the in-focus point. If not, the process returns to Block 302. If so, the interested focal point which corresponds to the maximum FV for only one frequency band remained in the set may be used as an in-focus point, or it may be considered that the in-focus point cannot be determined based on an image at present.

Herein, after the technical solution of an embodiment of the present disclosure is adopted, the in-focus point may be generally determined. However, when only one frequency band is remained in the set, if the in-focus point is still not determined, the interested focal point which corresponds to a maximum FV for only one frequency band remained in the set may be directly taken as the in-focus point, or it may be considered that the in-focus point cannot be determined based on the image at present.

Based on the above technical solution, in an embodiment of the present disclosure, an in-focus point may be determined based on FVs for the N frequency bands so that the clearest image may also be captured even if a curve formed by the FVs does not satisfy the characteristics such as a single peak type and unbiasedness. Moreover, when the FVs for the N frequency bands are used to determine the in-focus point, even if there is a local maximum FV (i.e., a pseudo peak) for a particular frequency band, the pseudo peak may be eliminated by the FVs for other frequency bands, thereby avoiding finding an inaccurate in-focus point.

Moreover, taking the FV for the lowest frequency band as a reference FV and then gradually switching tithe FV corresponding to a higher frequency band as the reference FV not only ensures that a searching direction is not lost, but also enables the reference FV to have a better anti-interference ability. In this way, the occurrence probability of a pseudo peak may be greatly reduced, and the problem of focusing failure due to a poor zooming and following effect may be avoided, thereby ensuring the rapidity of a focusing process and satisfying a real-time monitoring demand.

Figure 4B:
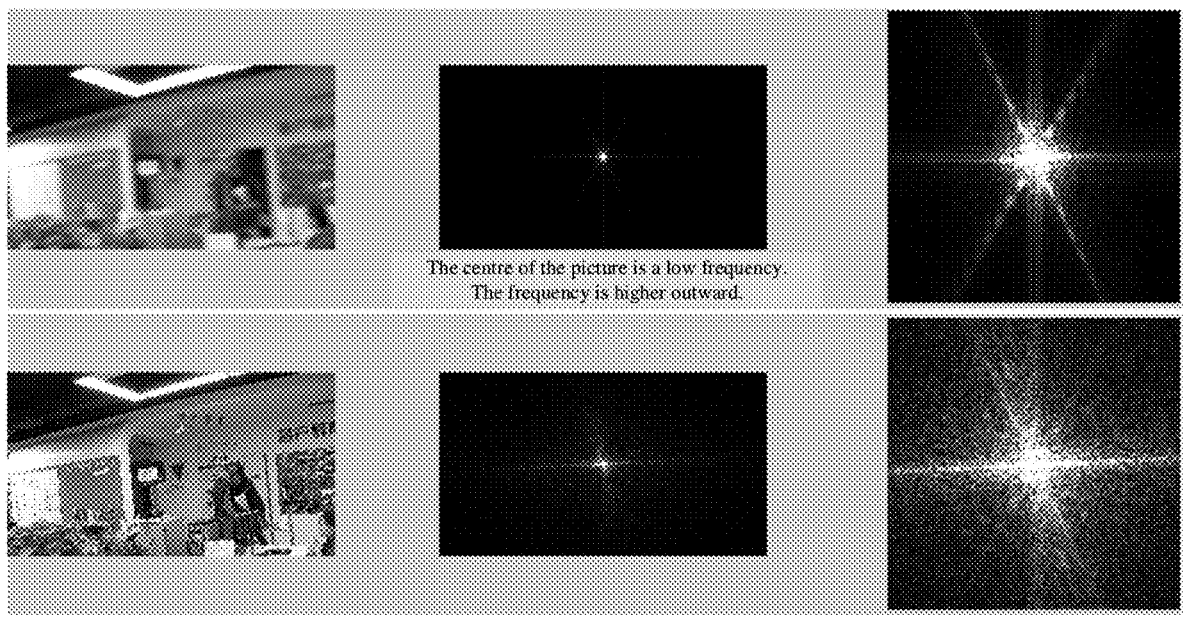

The effect of an embodiment of the present disclosure will be described in detail with reference to specific applications. FIG. 4B is a schematic diagram of contrasting an image in a spatial domain and an image in a frequency domain which are acquired in such a way that the images are subjected to Fourier transform by MATLAB simulation. It may be seen from this Figure that, when the picture is blurred, the energy is mainly concentrated in a low frequency component, and the region with a higher frequency will gradually have energy as an image gradually becomes clear. Therefore, the change range of energy in the region with a lower frequency is wide where a significant change in energy may be seen from the blurred state to the clear state; in contrast, the range of the energy change in the region with a higher frequency gradually becomes narrow where the energy almost appears only when the picture is clear. Therefore, the FV in the low frequency band changes obviously at any starting focal point, but it is susceptible to interference to form a pseudo peak. However, the FV for a high-frequency band has a stronger anti-interference ability, but the FV has a more obvious change only near a clear focal point, which has a higher zooming and following requirement.

Based on the above characteristics, in an embodiment of the present disclosure, the FV for a lowest frequency band is first selected as a reference FV. Since the FV for the lowest frequency band will not result in the situation as shown in FIG. 2, it may be ensured that focusing search direction can be quickly found at any focusing position even when the zooming and following has a serious deviation.

Moreover, when the FV for the lowest frequency band reaches the maximum FV, it is determined whether, for other frequency bands, the FVs corresponding tithe focal point which corresponds to FV for the lowest frequency band have also reached the maximum FV or not. If all the FVs are the maximum FV, it means that the maximum FV is a global peak value, and the interested focal point corresponding to a maximum FV is an in-focus point. If the FV for a particular frequency band does not reach the maximum FV, it means that the maximum FV for the lowest frequency band is a pseudo peak. The next frequency band instead of the lowest frequency band will be considered. In the above process, gradually switching to a higher frequency band not only ensures that a searching direction is not lost, but also enables the reference FV to have a better anti-interference ability. In this way, the occurrence probability of a pseudo peak may be greatly reduced and the focusing accuracy and rapidity is ensured, thereby satisfying a real-time monitoring demand.

Based on the same inventive concept as the above method, an embodiment of the present disclosure further provides a device of auto-focusing which may be applied to a platform device.

Figure 5:
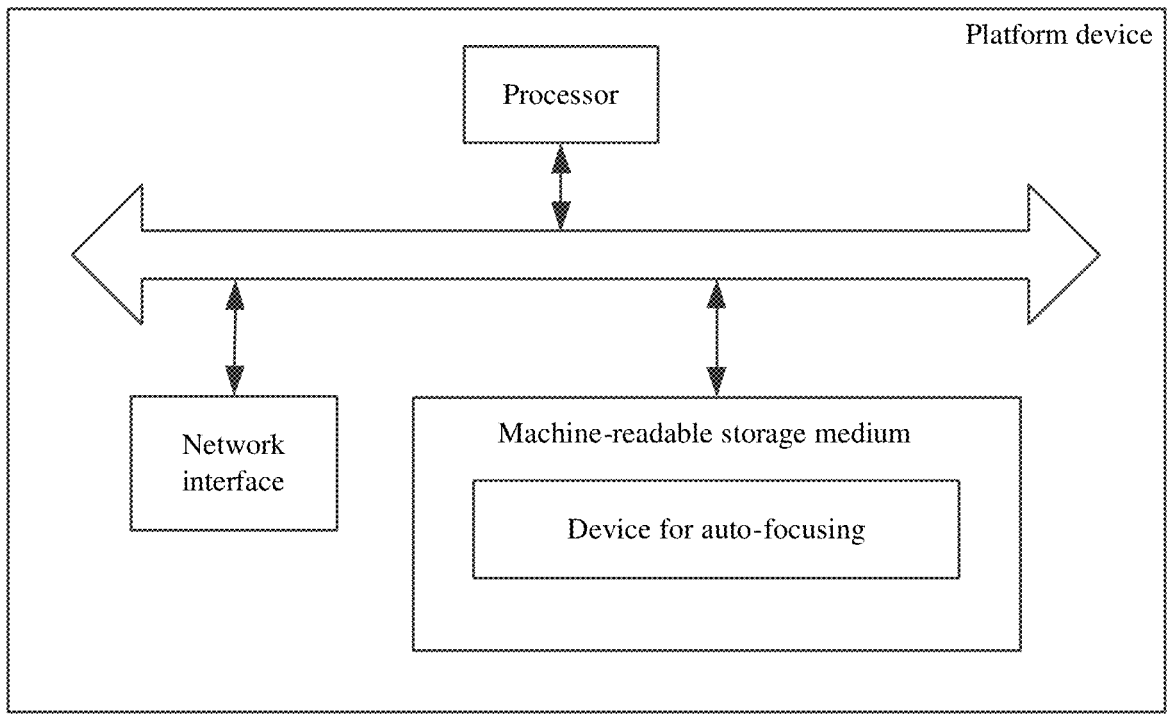
FIG. 5 is a hardware structure diagram of a platform device according to an example of the present disclosure.

As shown in FIG. 5, the platform device may include a processor 510 and a machine-readable storage medium 520, wherein the processor 510 and the machine-readable storage medium 520 are typically interconnected by an internal bus 530. In other possible implementations, the platform device may further include a network interface 540 so as to communicate with other devices or components.

In different examples, the machine-readable storage medium 520 may be a Radom Access Memory (RAM), a volatile memory, a non-volatile memory, a flash memory, a storage drive (e.g., a hard disk drive), a solid state hard disk, any type of storage disks (such as a compact disc, a DVD, etc.), or a similar storage medium, or a combination thereof.

Figure 6:
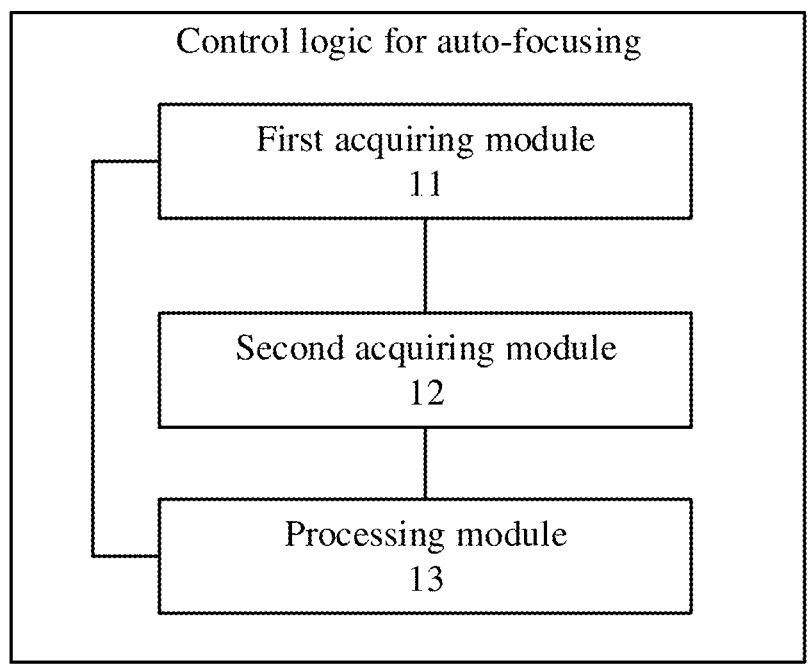
FIG. 6 is a functional module diagram of a control logic of auto-focusing according to another example of the present disclosure.

Further, the machine-readable storage medium 520 stores a machine-executable instruction corresponding to a control logic 600 of auto-focusing therein. As shown in FIG. 6, according to the function, the control logic 600 of auto-focusing may include:

a first acquiring module 11 configured for acquiring an image;

a second acquiring module 12 configured for acquiring, for each of N frequency bands of the image, a Focus Value corresponding to each of focal points during a focusing process, wherein the N frequency bands form a set, and the N is a positive integer greater than 1; and a processing module 13 configured for acquiring, for a lowest frequency band in the set, an interested focal point which corresponds to a maximum FV for the lowest frequency band; determining, for each of other frequency bands than the lowest frequency band in the set, whether the FV corresponding to the interested focal point is a maximum FV for the other frequency band or not; if the FV corresponding to the interested focal point for each of the other frequency bands is the maximum FV, determining that the interested focal point is an in-focus point; and if the FV corresponding to the interested focal point for any one of the other frequency bands is not the maximum FV, updating the set by deleting at least one frequency band for which the FV corresponding to the interested focal point reaches maximum from the set, acquiring a new interested focal point based on the updated set, and repeating the above determinations based on the new interested focal point.

Optionally, the second acquiring module 12 is specifically configured for transforming the image in a spatial domain into a transformed image in a frequency domain; decomposing the transformed image corresponding to the frequency domain into N number of sub-images respectively corresponding to the N frequency bands; and determining, for each of the N number of sub-images, a FV corresponding to each of the focal points during the focusing process so as to acquire the FV corresponding to each of the focal points during the focusing process for each of the N frequency bands.

Optionally, before an interested focal point which corresponds to the maximum FV for the lowest frequency band in the set is acquired as an interested focal point, the processing module 13 is further configured for sorting the frequency bands in the set in order of the frequency bands.

Optionally, when determining, for each of other frequency bands in the set, whether the FV corresponding to the interested focal point is the maximum FV for the other frequency band or not, the processing module 13 is specifically configured for taking the lowest frequency band in the set as a first frequency band; setting an initial value of i to 2; determining whether the FV corresponding to the interested focal point for the i-th frequency band is the maximum FV for the i-th frequency band or not; if the FV corresponding to the interested focal point for the i-th frequency band is the maximum FV and the i equals to N, determining that the FV corresponding to the interested focal point for each of the other frequency bands is the maximum FV; if the FV corresponding to the interested focal point for the i-th frequency band is the maximum FV and the i is less than N, updating the i by increasing the i with 1, and returning to determining whether the FV corresponding to the interested focal point for the i-th frequency band is the maximum FV for the i-th frequency band or not; and if the FV corresponding to the interested focal point for the i-th frequency band is not the maximum FV, determining that the FV corresponding to the interested focal point for any one of the other frequency bands is not the maximum FV.

Optionally, when determining, for each of other frequency bands in the set, whether the FV corresponding to the interested focal point is the maximum FV for the other frequency band or not, the processing module 13 is specifically configured for taking the lowest frequency band in the set as a N-th frequency band; setting an initial value of i to N−1; determining whether the FV corresponding to the interested focal point for the i-th frequency band is the maximum FV for the i-th frequency band or not; if the FV corresponding to the interested focal point for the i-th frequency band is the maximum FV and the i equals to 1, determining that the FV corresponding to the interested focal point for each of the other frequency bands is the maximum FV; if the FV corresponding to the interested focal point for the i-th frequency band is the maximum FV and the i is greater than 1, updating the i by decreasing the i with 1, and returning to determining whether the FV corresponding to the interested focal point for the i-th frequency band is the maximum FV for the i-th frequency band or not; and if the FV corresponding to the interested focal point for the i-th frequency band is not the maximum FV, determining that the FV corresponding to the interested focal point for any one of the other frequency bands is not the maximum FV.

Optionally, when deleting at least one frequency band for which the FV corresponding to the interested focal point reaches a maximum from the set, the processing module 13 is specifically configured for deleting the first M number of frequency bands from the set, wherein the M is a positive integer less than the N, if the FV corresponding to the interested focal point for each of a first M number of frequency bands in the set is the maximum FV but the FV corresponding to the interested focal point for the (M+1)-th frequency band is not the maximum FV.

Optionally, when deleting at least one frequency band in which the interested focal point reaches the maximum FV from the set, the processing module 13 is specifically configured for deleting the last (N−M+1) number of frequency bands from the set, where the M is a positive integer less than the N, if the FV corresponding to the interested focal point for each of a last (N−M+1) number of frequency bands in the set is the maximum FV but the FV corresponding to the interested focal point for the M-th frequency band is not the maximum FV.

Optionally, the processing module 13 may be further configured for, when only one frequency band is remained in the set, determining a focal point corresponding to the maximum FV for the frequency band as the in-focus point.

Herein, different modules of a device of the present disclosure may be integrated or may be deployed separately. The above modules may be combined or split into a plurality of sub-modules.

Taking software implementation as an example below, the fact that how a platform device executes the control logic 600 of auto-focusing will be further described. In this example, the control logic 600 of auto-focusing of the present disclosure may be understood as a machine-executable instruction stored in the machine-readable storage medium 520. When the processor 510 on the platform device of the present disclosure executes the control logic 600 of auto-focusing, the processor 510 executes the following operations by reading the machine-executable instruction corresponding to the control logic 600 of auto-focusing stored on the machine-readable storage medium 520:

acquiring an image;

acquiring, for each of N frequency bands of the image, a Focus Value corresponding to each of focal points during a focusing process, wherein the N frequency bands form a set, and the N is a positive integer greater than 1; and acquiring, for a lowest frequency band in the set, an interested focal point which corresponds to a maximum FV for the lowest frequency band; determining, for each of other frequency bands than the lowest frequency band in the set, whether the FV corresponding to the interested focal point is a maximum FV for the other frequency band or not; if the FV corresponding to the interested focal point for each of the other frequency bands is the maximum FV, determining that the interested focal point is an in-focus point; and if the FV corresponding to the interested focal point for any one of the other frequency bands is not the maximum FV, updating the set by deleting at least one frequency band for which the FV corresponding to the interested focal point reaches maximum from the set, acquiring a new interested focal point based on the updated set, and repeating the above determinations based on the new interested focal point.

According to an example, when acquiring, for each of the N frequency bands of the image, the FV corresponding to each of the focal points during the focusing process, the machine-executable instruction causes the processor 510 to execute:

transforming the image in spatial domain into a transformed image in a frequency domain;

decomposing the transformed image in the frequency domain into N number of sub-images respectively corresponding to the N frequency bands; and determining, for each of the N number sub-images, a FV corresponding to each of the focal points during the focusing process so as to acquire the FV corresponding to each of the focal points during the focusing process for each of the N frequency bands.

According to an example, before acquiring, for a lowest frequency band in the set, an interested focal point which corresponds to a maximum FV for the lowest frequency band, the machine-executable instruction further causes the processor 510 to execute:

Sorting the frequency bands in the set in order of the frequency bands.

According to an example, when determining, for each of other frequency bands than the lowest frequency band in the set, whether the FV corresponding to the interested focal point is a maximum FV for the other frequency band or not, the machine-executable instruction causes the processor 510 to execute:

taking the lowest frequency band in the set as a first frequency band;

setting an initial value of i to 2;

determining whether the FV corresponding to the interested focal point for the i-th frequency band is the maximum FV for the i-th frequency band or not; if the FV corresponding to the interested focal point for the i-th frequency band is the maximum FV and the i equals to N, determining that the FV corresponding to the interested focal point for each of the other frequency bands is the maximum FV; if the FV corresponding to the interested focal point for the i-th frequency band is the maximum FV and the i is less than N, updating the i by increasing the i with 1, and returning to determining whether the FV corresponding to the interested focal point for the i-th frequency band is the maximum FV for the i-th frequency band or not; and if the FV corresponding to the interested focal point for the i-th frequency band is not the maximum FV, determining that the FV corresponding to the interested focal point for any one of the other frequency bands is not the maximum FV.

According to an example, when determining, for each of the other frequency bands in the set, whether the FV corresponding to the interested focal point is the maximum FV for the other frequency band or not, the machine-executable instruction causes the processor 510 to execute:

taking the lowest frequency band in the set as a N-th frequency band;

setting an initial value of i to N−1;

determining whether the FV corresponding to the interested focal point for the i-th frequency band is the maximum FV for the i-th frequency band or not; if the FV corresponding to the interested focal point for the i-th frequency band is the maximum FV and the i equals to 1, determining that the FV corresponding to the interested focal point for each of the other frequency bands is the maximum FV; if the FV corresponding to the interested focal point for the i-th frequency band is the maximum FV and the i is greater than 1, updating the i by decreasing the i with 1, and returning to determining whether the FV corresponding to the interested focal point for the i-th frequency band is the maximum FV for the i-th frequency band or not; and if the FV corresponding to the interested focal point for the i-th frequency band is not the maximum FV, determining that the FV corresponding to the interested focal point for any one of the other frequency bands is not the maximum FV.

According to an example, when deleting the frequency band for which the FV corresponding to the interested focal point reaches a maximum from the set, the machine-executable instruction causes the processor 510 to execute:

if the FV corresponding to the interested focal point for each of a first M number of frequency bands in the set is the maximum FV but the FV corresponding to the interested focal point for the (M+1)-th frequency band is not the maximum FV, deleting the first M number of frequency bands from the set, wherein the M is a positive integer less than the N.

According to an example, when deleting the frequency band for which the FV corresponding to the interested focal point reaches a maximum from the set, the machine-executable instruction causes the processor 510 to execute:

if the FV corresponding to the interested focal point for each of a last (N−M+1) number of frequency bands in the set is the maximum FV but the FV corresponding to the interested focal point for the M-th frequency band is not the maximum FV, deleting the last (N−M+1) number of frequency bands from the set, where the M is a positive integer less than the N.

According to an example, the machine-executable instruction further causes the processor 510 to execute:

when only one frequency band is remained in the set, determining a focal point which corresponds to the maximum FV for the frequency band as the in-focus point.

Through the description of the above embodiments, it will be apparent to those skilled in the art that the present disclosure may be implemented by means of software plus a necessary general hardware platform, and of course may be implemented by means of the hardware, but in a plurality of cases the former is a better implementation. Based on this understanding, the technical solution of the present disclosure may be embodied in the form of a software product in essence or for the part which contributes to the prior art. The computer software product is stored in a storage medium including several instructions to enable a computer device (which may be a personal computer, a server, or a network device, etc.) to perform the methods described in the different embodiments of the present disclosure. It will be understood by those skilled in the art that the drawings are merely schematic diagrams of a preferred embodiment and that the modules or flows in the drawings are not necessarily essential to the practice of the present disclosure.

Those skilled in the art will appreciate that the modules in a device in an embodiment may be distributed in the device of the embodiment as described in the embodiment, or may be changed correspondingly to be located in one or more devices different from the present embodiment. The modules of the above embodiments may be combined into one module, or may be further split into a plurality of sub-modules. The sequences of above embodiments of the present disclosure are merely for the sake of description, rather than representative of superior or inferior embodiments.

While only a few specific embodiments of the present disclosure have been disclosed, the present disclosure is not limited thereto, and any changes that occur to those skilled in the art are intended to fall within the scope of protection of the present disclosure.

The invention claimed is:

1. A method of auto-focusing comprising:
acquiring an image;
acquiring, for each of N frequency bands of the image, a Focus Value corresponding to each of focal points during a focusing process, wherein the N frequency bands form a set, and the N is a positive integer greater than 1;
acquiring, for a lowest frequency band in the set, an interested focal point which corresponds to a maximum FV for the lowest frequency band;
determining, for each of other frequency bands than the lowest frequency band in the set, whether the FV corresponding to the interested focal point is a maximum FV for the other frequency band or not;
on the condition that the FV corresponding to the interested focal point for each of the other frequency bands is the maximum FV, determining that the interested focal point is an in-focus point; and on the condition that the FV corresponding to the interested focal point for any one of the other frequency bands is not the maximum FV, updating the set by deleting at least one frequency band for which the FV corresponding to the interested focal point reaches maximum from the set, acquiring a new interested focal point based on the updated set, and repeating the above determinations based on the new interested focal point.

2. The method according to claim 1, wherein acquiring, for each of the N frequency bands of the image, the FV corresponding to each of the focal points during the focusing process, comprises:

transforming the image in a spatial domain into a transformed image in a frequency domain;

decomposing the transformed image in the frequency domain into N number of sub-images respectively corresponding to the N frequency bands; and determining, for each of the N number of sub-images, a FV corresponding to each of the focal points during the focusing process so as to acquire the FV corresponding to each of the focal points during the focusing process for each of the N frequency bands.

3. The method according to claim 1, further comprising: sorting the frequency bands in the set in order of the frequency bands.

4. The method according to claim 3, wherein determining, for each of other frequency bands in the set, whether the FV corresponding to the interested focal point is the maximum FV for the other frequency band or not, comprises:

taking the lowest frequency band in the set as a first frequency band;

setting an initial value of i to 2;

determining whether the FV corresponding to the interested focal point for the i-th frequency band is the maximum FV for the i-th frequency band or not;

on the condition that the FV corresponding to the interested focal point for the i-th frequency band is the maximum FV and the i equals to N, determining that the FV corresponding to the interested focal point for each of the other frequency bands is the maximum FV;

on the condition that the FV corresponding to the interested focal point for the i-th frequency band is the maximum FV and the i is less than N, updating the i by increasing the i with 1, and returning to determining whether the FV corresponding to the interested focal point for the i-th frequency band is the maximum FV for the i-th frequency band or not; and on the condition that the FV corresponding to the interested focal point for the i-th frequency band is not the maximum FV, determining that the FV corresponding to the interested focal point for any one of the other frequency bands is not the maximum FV.

5. The method according to claim 3, wherein determining, for each of the other frequency bands in the set, whether the FV corresponding to the interested focal point is the maximum FV for the other frequency band or not, comprises:

taking the lowest frequency band in the set as a N-th frequency band;

setting an initial value of i to N−1;

determining whether the FV corresponding to the interested focal point for the i-th frequency band is the maximum FV for the i-th frequency band or not;

on the condition that the FV corresponding to the interested focal point for the i-th frequency band is the maximum FV and the i equals to 1, determining that the FV corresponding to the interested focal point for each of the other frequency bands is the maximum FV;

on the condition that the FV corresponding to the interested focal point for the i-th frequency band is the maximum FV and the i is greater than 1, updating the i by decreasing the i with 1, and returning to determining whether the FV corresponding to the interested focal point for the i-th frequency band is the maximum FV for the i-th frequency band or not; and on the condition that the FV corresponding to the interested focal point for the i-th frequency band is not the maximum FV, determining that the FV corresponding to the interested focal point for any one of the other frequency bands is not the maximum FV.

6. The method according to claim 4, wherein deleting at least one frequency band for which the FV corresponding to the interested focal point reaches a maximum from the set comprises:

on the condition that the FV corresponding to the interested focal point for each of a first M number of frequency bands in the set is the maximum FV but the FV corresponding to the interested focal point for the (M+1)-th frequency band is not the maximum FV, deleting the first M number of frequency bands from the set, wherein the M is a positive integer less than the N.

7. The method according to claim 5, wherein deleting at least one frequency band for which the FV corresponding to the interested focal point reaches a maximum from the set comprises:

on the condition that the FV corresponding to the interested focal point for each of a last (N−M+1) number of frequency bands in the set is the maximum FV but the FV corresponding to the interested focal point for the M-th frequency band is not the maximum FV, deleting the last (N−M+1) number of frequency bands from the set, where the M is a positive integer less than the N.

8. The method according to claim 1, further comprising: when only one frequency band is remained in the set, determining a focal point which corresponds to the maximum FV for the frequency band as the in-focus point.

9. A device of auto-focusing, comprising a processor configured to perform the following operations by reading machine-executable instruction corresponding to a control logic of auto-focusing stored in a machine-readable storage medium to execute the machine-executable instruction:

acquiring an image;

acquiring, for each of N frequency bands of the image, a Focus Value corresponding to each of focal points during a focusing process, wherein the N frequency bands form a set, and the N is a positive integer greater than 1;

acquiring, for a lowest frequency band in the set, an interested focal point which corresponds to a maximum FV for the lowest frequency band;

determining, for each of other frequency bands than the lowest frequency band in the set, whether the FV corresponding to the interested focal point is a maximum FV for the other frequency band or not;

on the condition that the FV corresponding to the interested focal point for each of the other frequency bands is the maximum FV, determining that the interested focal point is an in-focus point; and on the condition that the FV corresponding to the interested focal point for any one of the other frequency bands is not the maximum FV, updating the set by deleting at least one frequency band for which the FV corresponding to the interested focal point reaches maximum from the set, acquiring a new interested focal point based on the updated set, and repeating the above determinations based on the new interested focal point.

10. The device according to claim 9, wherein the machine-executable instruction causes the processor to execute the following operations when acquiring, for each of the N frequency bands of the image, the FV corresponding to each of the focal points during the focusing process:
  transforming the image in a spatial domain into a transformed image in a frequency domain;
  decomposing the transformed image corresponding to the frequency domain into N number of sub-images respectively corresponding to the N frequency bands; and
  determining, for each of the N number of sub-images, a FV corresponding to each of the focal points during the focusing process so as to acquire the FV corresponding to each of the focal points during the focusing process for each of the N frequency bands.

11. The device according to claim 9, wherein the machine-executable instruction further causes the processor to execute the following operation before acquiring, for a lowest frequency band in the set, an interested focal point which corresponds to a maximum FV for the lowest frequency band:
  Sorting the frequency bands in the set in order of the frequency bands.

12. The device according to claim 11, wherein the machine-executable instruction causes the processor to execute the following operations when determining, for each of other frequency bands in the set, whether the FV corresponding to the interested focal point is the maximum FV for the other frequency band or not:
  taking the lowest frequency band in the set as a first frequency band;
  setting an initial value of i to 2;
  determining whether the FV corresponding to the interested focal point for the i-th frequency band is the maximum FV for the i-th frequency band or not;
  on the condition that the FV corresponding to the interested focal point for the i-th frequency band is the maximum FV and the i equals to N, determining that the FV corresponding to the interested focal point for each of the other frequency bands is the maximum FV;
  on the condition that the FV corresponding to the interested focal point for the i-th frequency band is the maximum FV and the i is less than N, updating the i by increasing the i with 1, and returning to determining whether the FV corresponding to the interested focal point for the i-th frequency band is the maximum FV for the i-th frequency band or not; and on the condition that the FV corresponding to the interested focal point for the i-th frequency band is not the maximum FV, determining that the FV corresponding to the interested focal point for any one of the other frequency bands is not the maximum FV.

13. The device according to claim 11, wherein the machine-executable instruction causes the processor to execute the following operations when determining, for each of the other frequency bands in the set, whether the FV corresponding to the interested focal point is the maximum FV for the other frequency band or not:
  taking the lowest frequency band in the set as a N-th frequency band;
  setting an initial value of i to N−1;
  determining whether the FV corresponding to the interested focal point for the i-th frequency band is the maximum FV for the i-th frequency band or not;
  on the condition that the FV corresponding to the interested focal point for the i-th frequency band is the maximum FV and the i equals to 1, determining that the FV corresponding to the interested focal point for each of the other frequency bands is the maximum FV;
  on the condition that the FV corresponding to the interested focal point for the i-th frequency band is the maximum FV and the i is greater than 1, updating the i by decreasing the i with 1, and returning to determining whether the FV corresponding to the interested focal point for the i-th frequency band is the maximum FV for the i-th frequency band or not; and on the condition that the FV corresponding to the interested focal point for the i-th frequency band is not the maximum FV, determining that the FV corresponding to the interested focal point for any one of the other frequency bands is not the maximum FV.

14. The device according to claim 12, wherein the machine-executable instruction causes the processor to execute the following operation when deleting at least one frequency band for which the FV corresponding to the interested focal point reaches a maximum from the set:
  on the condition that the FV corresponding to the interested focal point for each of a first M number of frequency bands in the set is the maximum FV but the FV corresponding to the interested focal point for the (M+1)-th frequency band is not the maximum FV, deleting the first M number of frequency bands from the set, wherein the M is a positive integer less than the N.

15. The device according to claim 13, wherein the machine-executable instruction causes the processor to execute the following operation when deleting at least one frequency band for which the FV corresponding to the interested focal point reaches a maximum from the set:
  on the condition that the FV corresponding to the interested focal point for each of a last (N−M+1) number of frequency bands in the set is the maximum FV but the FV corresponding to the interested focal point for the M-th frequency band is not the maximum FV, deleting the last (N−M+1) number of frequency bands from the set, where the M is a positive integer less than the N.

16. The device according to claim 9, wherein the machine-executable instruction further causes the processor to execute the following operation: when only one frequency band is remained in the set, determining a focal point which corresponds to the maximum FV for the frequency band as the in-focus point.

* * * * *